United States Patent
Tan et al.

(10) Patent No.: US 12,393,899 B2
(45) Date of Patent: Aug. 19, 2025

(54) MODIFYING FUTURE WORKFLOW BASED ON INFORMATION RECEIVED AT CURRENT DAY

(71) Applicant: MOTOROLA SOLUTIONS, INC., Chicago, IL (US)

(72) Inventors: Chun Meng Tan, Penang (MY); Brian J. Frommelt, Naperville, IL (US); Christian Ibarra, Weston, FL (US); Wei Ling Cecilia Liaw, Penang (MY); Jin Hoe Phua, Perak (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 108 days.

(21) Appl. No.: 17/449,387

(22) Filed: Sep. 29, 2021

(65) Prior Publication Data
US 2023/0111833 A1    Apr. 13, 2023

(51) Int. Cl.
*G06Q 10/0633*    (2023.01)
*G06Q 10/0631*    (2023.01)

(52) U.S. Cl.
CPC ... *G06Q 10/0633* (2013.01); *G06Q 10/06312* (2013.01)

(58) Field of Classification Search
CPC .............. G06Q 10/0633; G06Q 10/06312
See application file for complete search history.

(56) References Cited

U.S. PATENT DOCUMENTS

| | | | |
|---|---|---|---|
| 7,805,327 B1 * | 9/2010 | Schulz ................. | G06F 9/5038 705/7.26 |
| 8,093,993 B2 | 1/2012 | Chou et al. | |
| 9,106,698 B2 | 8/2015 | Guan et al. | |
| 9,746,985 B1 * | 8/2017 | Humayun ............ | G06F 16/904 |

(Continued)

FOREIGN PATENT DOCUMENTS

EP    3552069 B1 *    3/2022 ............. B64C 39/02

OTHER PUBLICATIONS

Z. An, Y. Xu and Y. Tan, "Situation Deduction and Emergency Decision Making Algorithm for Urban Fire based on Modified Cellular Automata Method," 2020 IEEE International Conference on Mechatronics and Automation (ICMA), Beijing, China, 2020, pp. 302-330 (Year: 2020).*

*Primary Examiner* — Jerry O'Connor
*Assistant Examiner* — Philip N Warner
(74) *Attorney, Agent, or Firm* — Michael Best & Friedrich LLP (57) ABSTRACT

Apparatus and method for modifying future workflows based on information received at current day. The method includes receiving, at an electronic processor, information corresponding to an object of interest and analyzing, using the electronic processor, the information to identify one or more attributes corresponding to the object of interest affecting an incident workflow for the object of interest. The method also includes generating, using the electronic processor, a modified incident workflow for the object of interest based on the incident workflow and the one or more (Continued)

attributes and storing, in a database, the modified incident workflow and a trigger condition corresponding to the modified incident workflow such that the modified incident workflow and the trigger condition are related to the object of interest in the database. The trigger condition is generated based on the one or more attributes.

24 Claims, 6 Drawing Sheets

(56) References Cited

U.S. PATENT DOCUMENTS

| | | | |
|---|---|---|---|
| 9,760,848 B2 | 9/2017 | Farmer et al. | |
| 9,807,187 B2 | 10/2017 | Herman | |
| 9,813,779 B2 | 11/2017 | Deo et al. | |
| 10,777,051 B1* | 9/2020 | Kumar | G05D 1/692 |
| 10,963,821 B2* | 3/2021 | Barnes | G06T 11/206 |
| 2015/0242619 A1* | 8/2015 | Bender | H04L 63/10 |
| | | | 726/22 |
| 2015/0278289 A1 | 10/2015 | Lawrence et al. | |
| 2015/0365246 A1* | 12/2015 | Kane | H04W 4/021 |
| | | | 709/203 |
| 2016/0344827 A1* | 11/2016 | Gordon | G06Q 10/10 |
| 2017/0262604 A1* | 9/2017 | Francois | G16H 10/60 |
| 2017/0351829 A1* | 12/2017 | Wolz | G16H 40/67 |
| 2018/0053394 A1* | 2/2018 | Gersten | G08B 17/08 |
| 2019/0230467 A1* | 7/2019 | Williams | H04L 67/306 |
| 2020/0092178 A1* | 3/2020 | Nelson | G06Q 10/06316 |
| 2020/0135005 A1* | 4/2020 | Katz | H04M 7/0021 |
| 2021/0117446 A1* | 4/2021 | Siddiq | G06F 16/284 |
| 2021/0166534 A1* | 6/2021 | Derickson | G08B 27/001 |
| 2021/0192422 A1 | 6/2021 | Gutsol et al. | |
| 2021/0287318 A1* | 9/2021 | Sterpin | H04W 4/33 |
| 2021/0366069 A1* | 11/2021 | Robinson-Grayson | G06Q 50/265 |
| 2022/0027806 A1* | 1/2022 | Burman | G06Q 10/06316 |
| 2022/0274019 A1* | 9/2022 | Delmonico | H04L 67/131 |
| 2022/0283570 A1* | 9/2022 | Kameshiro | G05B 19/41845 |
| 2023/0044564 A1* | 2/2023 | Jezewski | G06F 40/30 |

* cited by examiner

| Object Of Interest | Attribute 1 | Attribute 2 | Attribute 3 |
|---|---|---|---|
| Kelly | Address - Unit 3A, Block 3, Golden Sand Garden, Silver Rock Street. | Medical History - Handicapped | |
| John | Address - ABC Technology, Phase 4, Sesame Industrial Park | Medical History - Allergy To Substance A | |
| Rick | | | Knowledge - Red Cross Member Well Trained With First Aid Skills |
| 101 Main Street | Occupancy - Unoccupied | Dangerous Material - Stores Inflammable Chemical A | |

FIG. 4A

| Object Of Interest | First Incident Type | First Trigger Condition | Second Incident Type |
|---|---|---|---|
| 101 Main Street | First Original Incident Workflow | Unoccupied -No | Second Original Incident Workflow |
| | First Modified Incident Workflow | Unoccupied -Yes | |

MODIFYING FUTURE WORKFLOW BASED ON INFORMATION RECEIVED AT CURRENT DAY

BACKGROUND OF THE INVENTION

Public safety organizations receive intelligence every day. The intelligence may be related to a person, an address, a business, or the like, which are often referred to as an "object of interest" and further described and defined herein.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It should be understood that although certain figures presented herein illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

DETAILED DESCRIPTION OF THE INVENTION

Information received for an object of interest may not be immediately useful. The information may become useful for an action performed by the public safety personnel in the future. However, public safety personnel may not recall the information provided to them at a future time when performing the required action.

Accordingly, there is a need for workflow management to modify workflows based on information received at current day.

One embodiment provides a command server including an electronic processor. The electronic processor is configured to receive information corresponding to an object of interest and analyze the information to identify one or more attributes corresponding to the object of interest affecting an incident workflow for the object of interest. The electronic processor is further configured to generate a modified incident workflow for the object of interest based on the incident workflow and the one or more attributes and store, in a database, the modified incident workflow and a trigger condition corresponding to the modified incident workflow such that the modified incident workflow and the trigger condition are related to the object of interest in the database. The trigger condition is generated based on the one or more attributes. The electronic processor is also configured to receive a request for action corresponding to the object of interest and determine whether the request satisfies the trigger condition. The electronic processor is further configured to output the modified incident workflow when the request satisfies the trigger condition and output the incident workflow when the request does not satisfy the trigger condition.

Another embodiment provides a method for modifying future workflows based on information received at current day. The method includes receiving, at an electronic processor, information corresponding to an object of interest and analyzing, using the electronic processor, the information to identify one or more attributes corresponding to the object of interest affecting an incident workflow for the object of interest. The method also includes generating, using the electronic processor, a modified incident workflow for the object of interest based on the incident workflow and the one or more attributes and storing, in a database, the modified incident workflow and a trigger condition corresponding to the modified incident workflow such that the modified incident workflow and the trigger condition are related to the object of interest in the database. The trigger condition is generated based on the one or more attributes. The method further includes receiving, at the electronic processor, a request for action corresponding to the object of interest and determining, using the electronic processor whether the request satisfies the trigger condition. The method also includes outputting, using the electronic processor, the modified incident workflow when the request satisfies the trigger condition and outputting, using the electronic processor, the incident workflow when the request does not satisfy the trigger condition.

Figure 1:
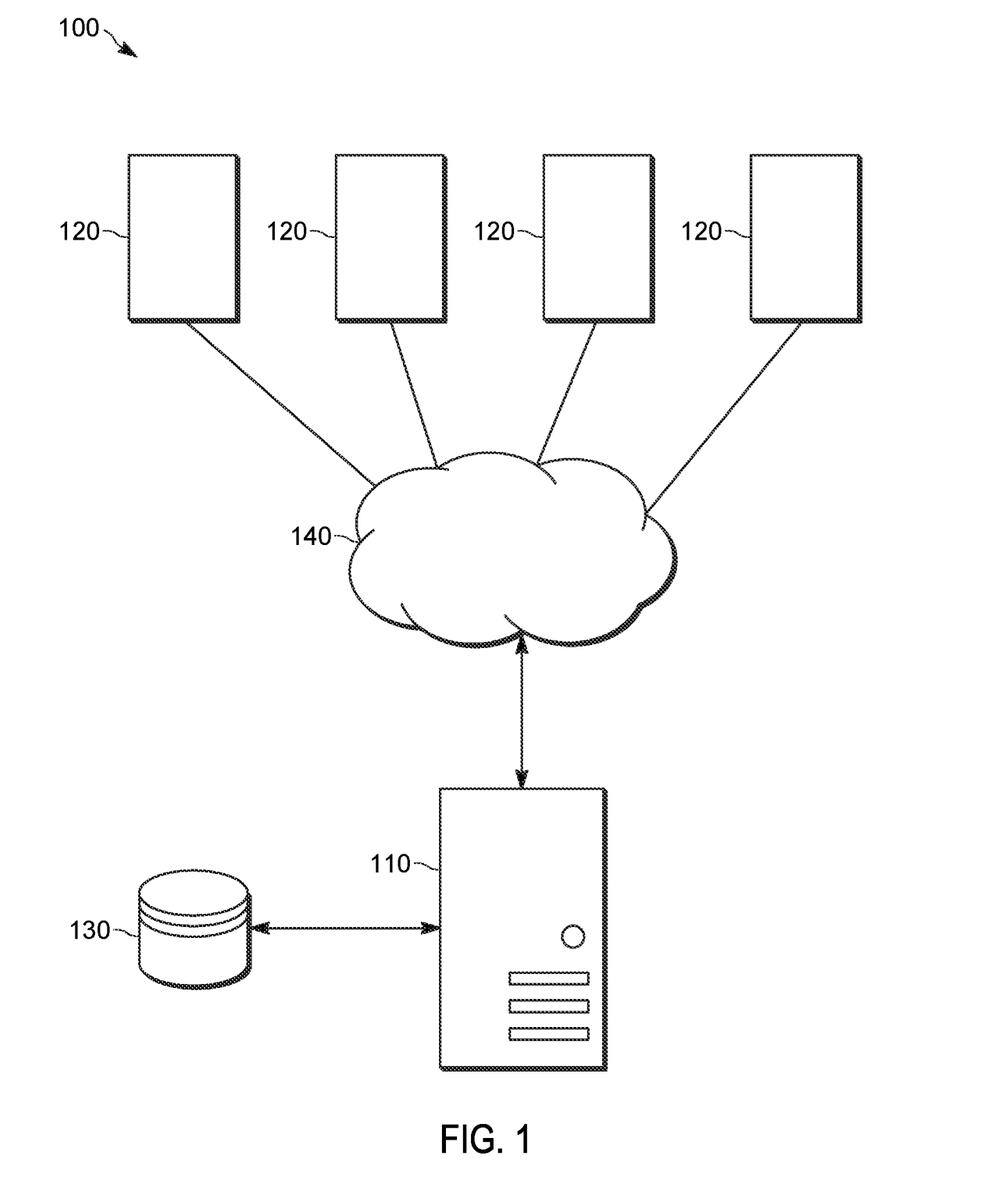
FIG. 1 is a block diagram of a workflow modification system in accordance with some embodiments.

With reference to FIG. 1, a workflow modification system 100 includes a command server 110, a plurality of data sources 120 for gathering information regarding objects of interest, and a workflow management database 130. The command server 110 communicates with the plurality of data sources 120 over a communication network 140. The workflow modification system 100 may include more or fewer components than those illustrated in FIG. 1 and may perform additional functions other than those described herein. The command server 110 is a computing device implemented in a cloud infrastructure or located at a public safety facility or other location. The plurality of data sources 120 include, for example, portable communications device (for example, portable two-way radios, mobile two-way radios, smart telephones, and the like), computing devices (for example, workstations, laptop computer, tablet computers, and the like), IoT devices (for example, CCTV cameras, doorway scanners, or the like), social media and community engagement electronic applications (for example, TipSubmit), or the like that are assigned to public safety personnel. The communication network 140 is, for example, a Wi-Fi® network, a cellular network, or the like, or a combination of one or more wired networks and/or one or more wireless networks.

Figure 2:
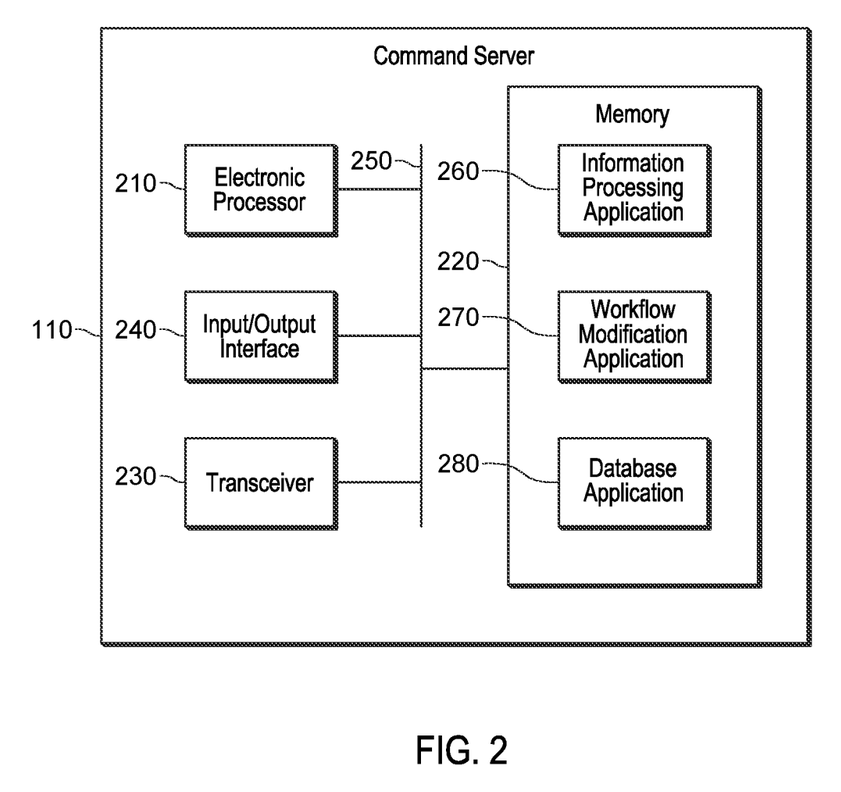
FIG. 2 is a block diagram of a command server of the workflow modification system of FIG. 1 in accordance with some embodiments.

FIG. 2 is a block diagram of one embodiment of the command server 110. In the example illustrated, the command server 110 includes an electronic processor 210, a memory 220, a transceiver 230, and an input/output interface 240. The electronic processor 210, the memory 220, the transceiver 230, and the input/output interface 240 communicate over one or more control and/or data buses (for example, a communication bus 250). FIG. 2 illustrates only one example embodiment of the command server 110. The command server 110 may include more or fewer components and may perform functions other than those explicitly described herein.

In some embodiments, the electronic processor 210 is implemented as a microprocessor with separate memory, such as the memory 220. In other embodiments, the electronic processor 210 may be implemented as a microcontroller (with memory 220 on the same chip). In other embodiments, the electronic processor 210 may be implemented using multiple processors. In addition, the electronic processor 210 may be implemented partially or entirely as, for example, a field-programmable gate array (FPGA), an applications specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out the functionality of the command server 110 described herein. The memory 220 may include, for example, a program storage area and a data storage area. The program storage area and the data storage area may include combinations of different types of memory, such as read-only memory and random-access memory.

The transceiver 230 enables wired and/or wireless communication of the command server 110 with the plurality of data sources 120 over the communication network 140. In some embodiments, the transceiver 230 may comprise separate transmitting and receiving components. The input/output interface 240 may include one or more input mechanisms (for example, a touch pad, a keypad, and the like), one or more output mechanisms (for example, a display, a speaker, and the like), or a combination thereof, or a combined input and output mechanism such as a touch screen.

The memory 220 stores several applications that are executed by the electronic processor 210. In the example illustrated, the memory 220 includes an information processing application 260, a workflow modification application 270, and a database application 280. The information processing application 260 is executed to analyze information received from the plurality of data sources 120. The information processing application 260 determines the objects of interest to which the information applies to creates one or more attributes relating to the objects of interest based on the information. The workflow modification application 270 is executed to modify one or more workflows pertaining to an object of interest based on the information. The workflow modification application 270 identifies an incident workflow to which the received information pertains to and modifies the incident workflow to generate a modified incident workflow based on the original incident workflow and the one or more attributes. The database application 280 is executed to store and retrieve data from the workflow management database 130. The database application 280 writes data to the workflow management database 130, for example, by relating one or more attributes to an object of interest and by relating modified workflows to incident types and objects of interest. The database application 280 also retrieves data from the workflow management database 130 for use by the electronic processor 210.

With reference to FIG. 1, the command server 110 is also in communication with a workflow management database 130. In the example illustrated, the workflow management database 130 is illustrated as being separate from the command server 110. For example, the workflow management database 130 may be provided at a separate device and/or separate location. In some embodiments, the workflow management database 130 is included within the memory 220 of the command server 110. In some embodiments, the workflow management database 130 is decentralized such that the workflow management database 130 is distributed among several devices. The workflow management database 130 stores data in a table, relational, hierarchical or other structure relating one object to another using pre-defined rules. In one example, the workflow management database 130 includes several related tables. In a first table, the workflow management database 130 relates an object of interest to the object of interest's attributes. In a second table, the workflow management database 130 relates an object of interest to the object of interest's workflows by incident type and so on.

Figure 3:
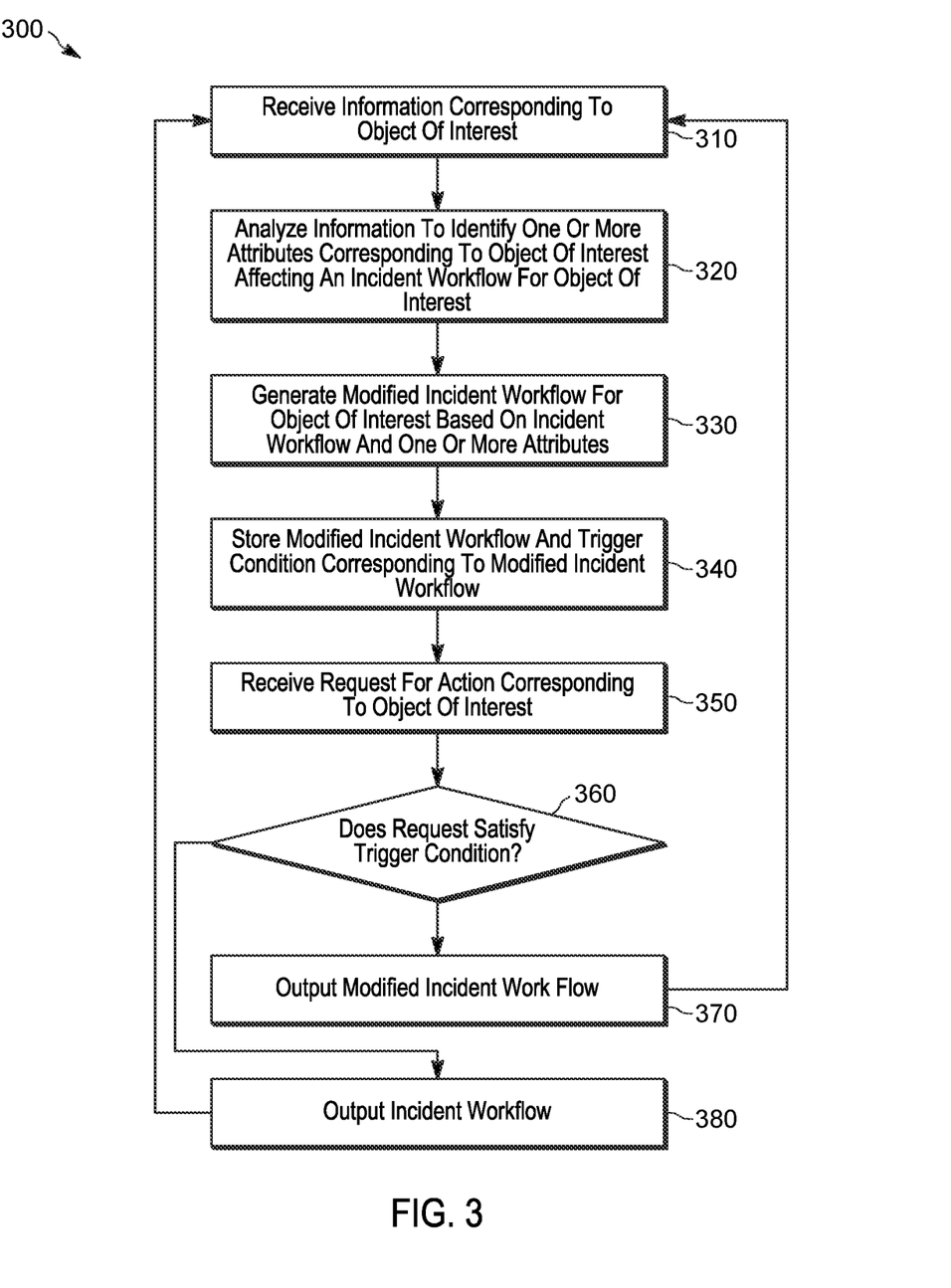
FIG. 3 is a flowchart of a method for modifying future workflow based on information received at current day in accordance with some embodiments.

FIG. 3 illustrates a flowchart of an example method 300 for modifying future workflows based on information received at current day. In the example illustrated in FIG. 3, the method 300 includes receiving, at the electronic processor 210, information corresponding to an object of interest (at block 310). The information includes intelligence gathered by public safety personnel regarding objects of interest. The information may be received through the plurality of data sources 120. For example, a public safety personnel gathering intelligence may enter the information on a data source 120, which is then transmitted to the command server 110 over the communication network 140.

The method 300 includes analyzing, using the electronic processor 210, the information to identify one or more attributes corresponding to the object of interest affecting an incident workflow for the object of interest (at block 320). The electronic processor 210 executes the information processing application 260 to analyze the information and extract one or more attributes pertaining to an object of interest. In one example, a public safety agency becomes aware of a handicapped resident at a first location. The public safety agency may receive this information based on, for example, the resident self-reporting, interaction of the resident with public safety personnel, officer or camera analytics that identify a wheelchair ramp access or handicap license plate, or the like. The information processing application 260 analyzes this information to extract the name of the resident (for example, object of interest), the address at which the resident resides (for example, attribute 1 or related object of interest), and condition of the resident, that is, that the resident has a handicap (for example, attribute 2).

Figure 4A:
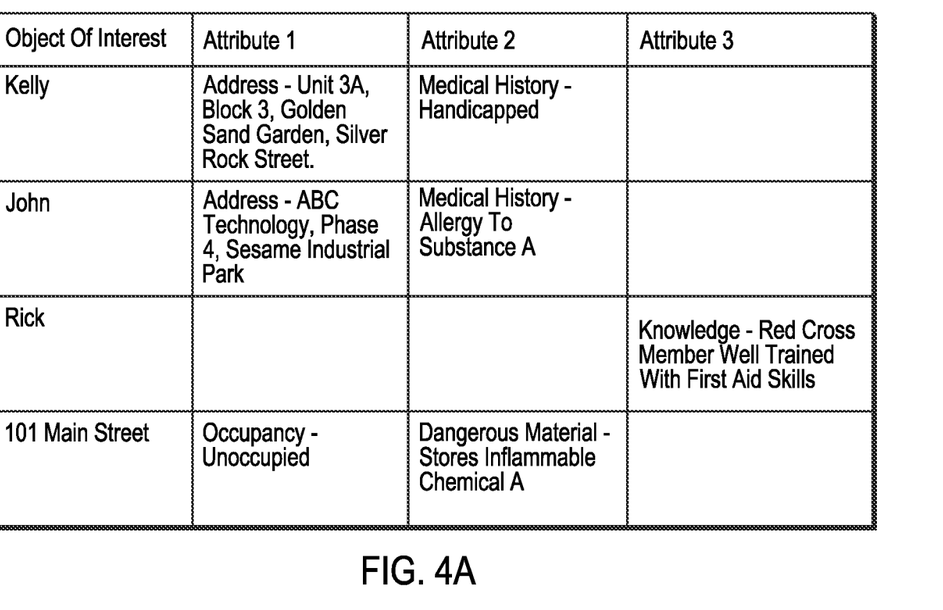
FIGS. 4A and 4B illustrate example databases of the workflow modification system of FIG. 1 in accordance with some embodiments.

In a second example, the public safety agency becomes aware of an unoccupied structure. The information processing application 260 may similarly extract the address, any harmful or flammable material, and the like corresponding to the structure. In a third example, the public safety agency becomes aware of a history of domestic violence at an address. The information processing application 260 may extract the address, names of the persons residing at the address, aggressor labels, and the like. In a fourth example, the public safety agency becomes aware of a mental state of a person. The information processing application 260 extracts the name and physical characteristics of the person, known addresses of the person, and the like. The objects of interest and attributes are stored in the workflow management database 130. The electronic processor 210 executes the database application 280 to store the one or more attributes such that the one or more attributes are related to the object of interest in the workflow management database 130. The objects of interest and the attributes may be stored in a table or other relational data structure such that the attributes are related to the object of interest in the workflow management database 130. FIG. 4A illustrates one example of a table relating objects of interest to corresponding attributes.

The electronic processor 210 also determines whether the one or more attributes of the object of interest affect any incident workflows associated with the object of interest. Incident workflows are, for example, workflows followed by public safety personnel when an incident occurs at, to, or relating to the object of interest. Incident workflows for each object of interest are stored in the workflow management database 130 and may be classified according to the incident type to which the incident workflow applies. For example, each address in a precinct may have a fire incident workflow, a domestic incident workflow, a theft incident workflow associated with the address. The electronic processor 210 determines whether the one or more attributes relating to an object of interest affect an incident workflow for the object of interest. For example, when a fire incident occurs at an address having an unoccupied attribute, the fire incident workflow may be affected such that public safety personnel need not enter the premises to secure any persons in the premises.

Figure 5:
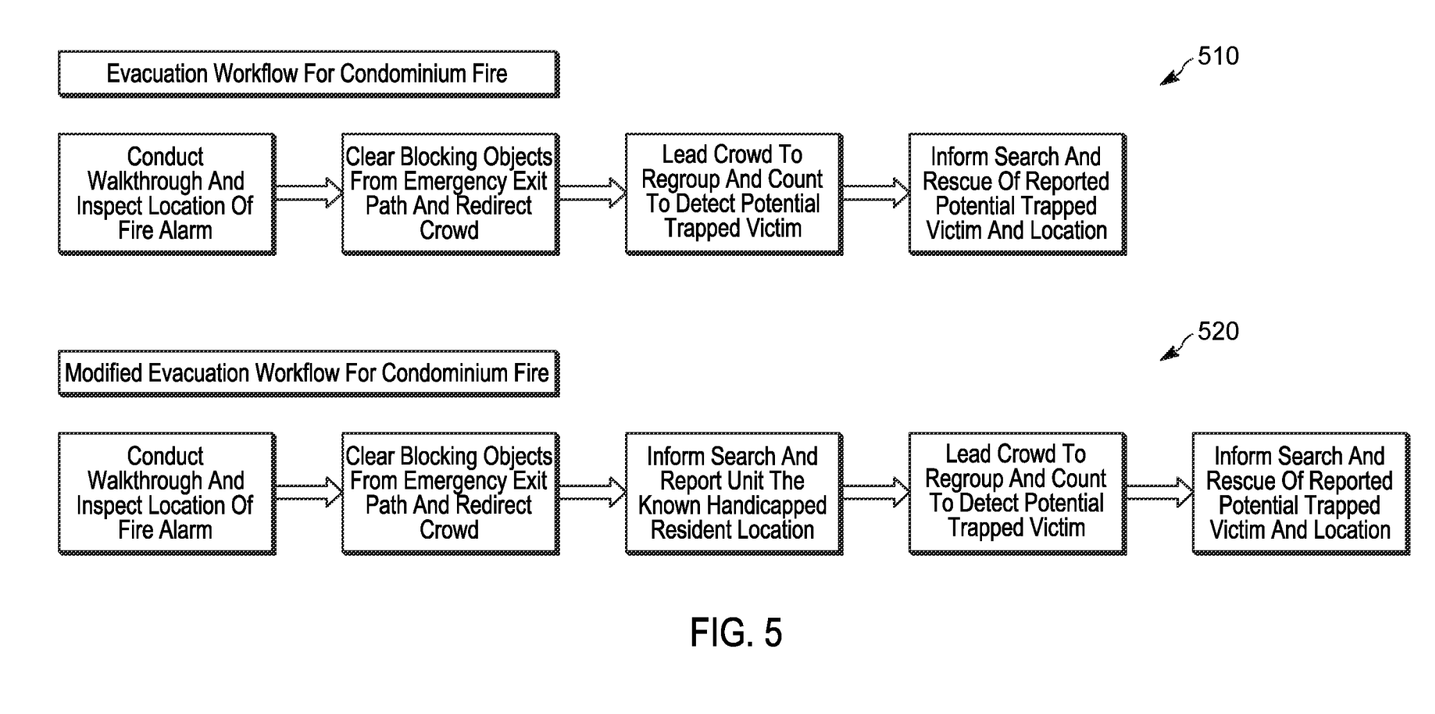
FIG. 5 illustrates an example workflow modification performed by the workflow modification system of FIG. 1 in accordance with some embodiments.

Returning to FIG. 3, the method 300 includes generating, using the electronic processor 210, a modified incident workflow for the object of interest based on the incident workflow and the one or more attributes (at block 330). The electronic processor 210 executes the workflow modification application 270 to modify a workflow for the object of interest based on the original incident workflow and the one or more attributes. Continuing the fire incident example above, the electronic processor 210 may modify the fire incident workflow to remove a step of public safety personnel entering the facility before the fire is completely exhausted. FIG. 5 illustrates one example of generating a modified incident workflow. As illustrated in FIG. 5, original incident workflow 510 includes a set of steps performed by the public safety personnel when, for example, a fire alarm is reported at a condominium. The modified incident workflow 520 is generated by adding an additional step to the original incident workflow due to one or more attributes of the condominium.

Figure 4B:
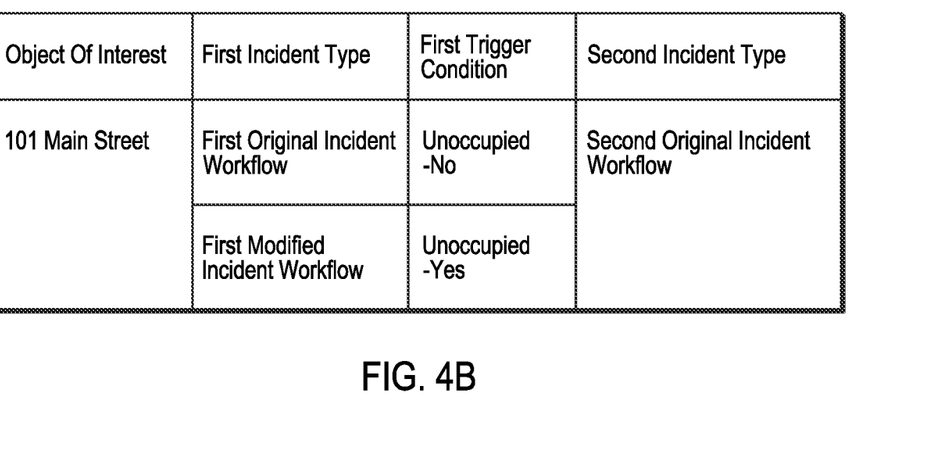

The method 300 includes storing, in the workflow management database 130, the modified incident workflow and a trigger condition corresponding to the modified incident workflow (at block 340). The trigger condition is generated based on the one or more attributes of the object of interest. The trigger condition is a condition which when present triggers the modified incident workflow over the original incident workflow. For example, when a handicapped resident is present inside a structure currently under a fire incident, the presence of the handicapped resident is the trigger condition that may require execution of the modified incident workflow over the original incident workflow. The electronic processor 210 executes the database application 280 to write the modified incident workflow to the workflow management database 130. The modified incident workflow and the trigger condition are stored in the workflow management database 130 such that the modified incident workflow and the trigger condition are related to the object of interest in the workflow management database 130. The objects of interest and the incident workflows and corresponding trigger conditions may be stored in a table or other relational data structure. FIG. 4B illustrates one example of a table relating objects of interest to corresponding incident workflows and trigger conditions.

The incident workflows may be further be stored in relation to an incident type in workflow management database 130. For example, a first original incident workflow and a first modified workflow may be stored in relation to a first incident type for the object of interest. A first trigger condition helps determine whether the first original incident workflow or the first modified incident workflow is to be executed for the first incident type for the object of interest. A second incident workflow may be related to a second incident type for the object of interest.

Returning to FIG. 3, the method 300 includes receiving, at the electronic processor 210, a request for action corresponding to the object of interest (at block 350). The request may be received from a responding device, for example, a portable communications device of a responding public safety personnel at an incident location. The request includes one or more fields describing the incident. For example, the request includes an object field, an incident field, and a condition field. The object field may be used to identify one or more objects of interest to which the incident pertains. For example, when a fire incident is taking place, the object field may identify a structure and/or an address of the incident. The incident field may be used to identify the type of incident, for example, a fire incident, a robbery incident, and the like. The condition field may be used to identify one or more conditions of the incident. For example, whether the whereabouts of a person residing at a structure of the fire incident are known.

The method 300 includes determining, using the electronic processor 210, whether the request satisfies the trigger condition (at block 360). The electronic processor 210 may first determine whether the incident type includes more than one incident workflow, for example, an original incident workflow and a modified incident workflow. The electronic processor 210 then determines whether the request satisfies the trigger condition of one or more modified incident workflows associated with the object of interest for the incident type.

The method 300 includes outputting, using the electronic processor 210, the modified incident workflow when the request satisfies the trigger condition (at block 370). The electronic processor 210 executes the database application 280 to extract the modified incident workflow from the workflow management database 130. The electronic processor 210 outputs the modified incident workflow to a display of the command server 110 and/or to one or more portable communications devices of responding public safety personnel at the incident location. Referring to the example in FIG. 4B, the electronic processor 210 outputs the first modified incident workflow in response to the object field of the request specifying the object of interest (that is, "101 Main Street"), the incident field of the request specifying the first incident type (for example, a fire incident), and the condition field specifying the first trigger condition (for example, no occupant was noticed upon cursory inspection).

The method 300 includes outputting, using the electronic processor 210, the incident workflow when the request does not satisfy the trigger condition (at block 380). The electronic processor 210 executes the database application 280 to extract the original incident workflow from the workflow management database 130. The electronic processor 210 outputs the original incident workflow to a display of the command server 110 and/or to one or more portable communications devices of responding public safety personnel at the incident location. Referring to the example in FIG. 4B, the electronic processor 210 outputs the first original incident workflow in response to the object field of the request specifying the object of interest (that is, "101 Main Street"), the incident field of the request specifying the first incident type (for example, a fire incident), and the condition field not specifying the first trigger condition (for example, an occupant was noticed upon cursory inspection).

In some embodiments, the one or more attributes of the object of interest affect more than one incident workflow associated with the object of interest. For example, a second incident workflow for a second incident type is affected by the one or more attributes of the object of interest. The electronic processor 210 identifies the second incident workflow corresponding to the second incident type associated by the one or more attributes and generates a second modified incident workflow for the object of interest based on the second incident workflow and the one or more attributes. The electronic processor 210 stores the second modified incident workflow and a second trigger condition corresponding to the second modified incident workflow such that the second modified incident workflow and the second trigger condition are related to the object of interest in the workflow management database 130. The second trigger condition, like the first trigger condition, is generated based on the one or more attributes. The electronic processor 210 outputs the second modified incident workflow in response to the object field of the request specifying the object of interest, the incident field of the request specifying the second incident type, and the condition field of the request specifying the second trigger condition. The electronic processor 210 outputs the second incident workflow in response to the object field of the request specifying the object of interest, the incident field of the request specifying the second incident type, and the condition field of the request not specifying the second trigger condition. As discussed above, the outputs may be provided at a user interface of the command server 110 or at a portable communications device of a responding public safety personnel.

In some embodiments, the electronic processor 210 identifies a plurality of incident workflows for the object of interest affected by the one or more attributes and generates a plurality of modified incident workflows for the object of interest based on the plurality of incident workflows and the one or more attributes. The electronic processor 210 stores the plurality of modified incident workflows and a plurality of trigger conditions corresponding to the plurality of modified incident workflows such that the plurality of modified incident workflows and the plurality of trigger conditions are related to the object of interest in the database. The plurality of trigger conditions, like the first and second trigger conditions, are generated based on the one or more attributes.

In some embodiments, the incident workflow may be changed on the fly during an incident due to a detected trigger condition. After outputting the original incident workflow, the electronic processor 210 may receive an updated request satisfying the trigger condition. For example, the condition field in the updated request may be changed to specify the trigger condition. The electronic processor 210 outputs the modified incident workflow in response to the updated request satisfying the trigger condition.

Figure 6:
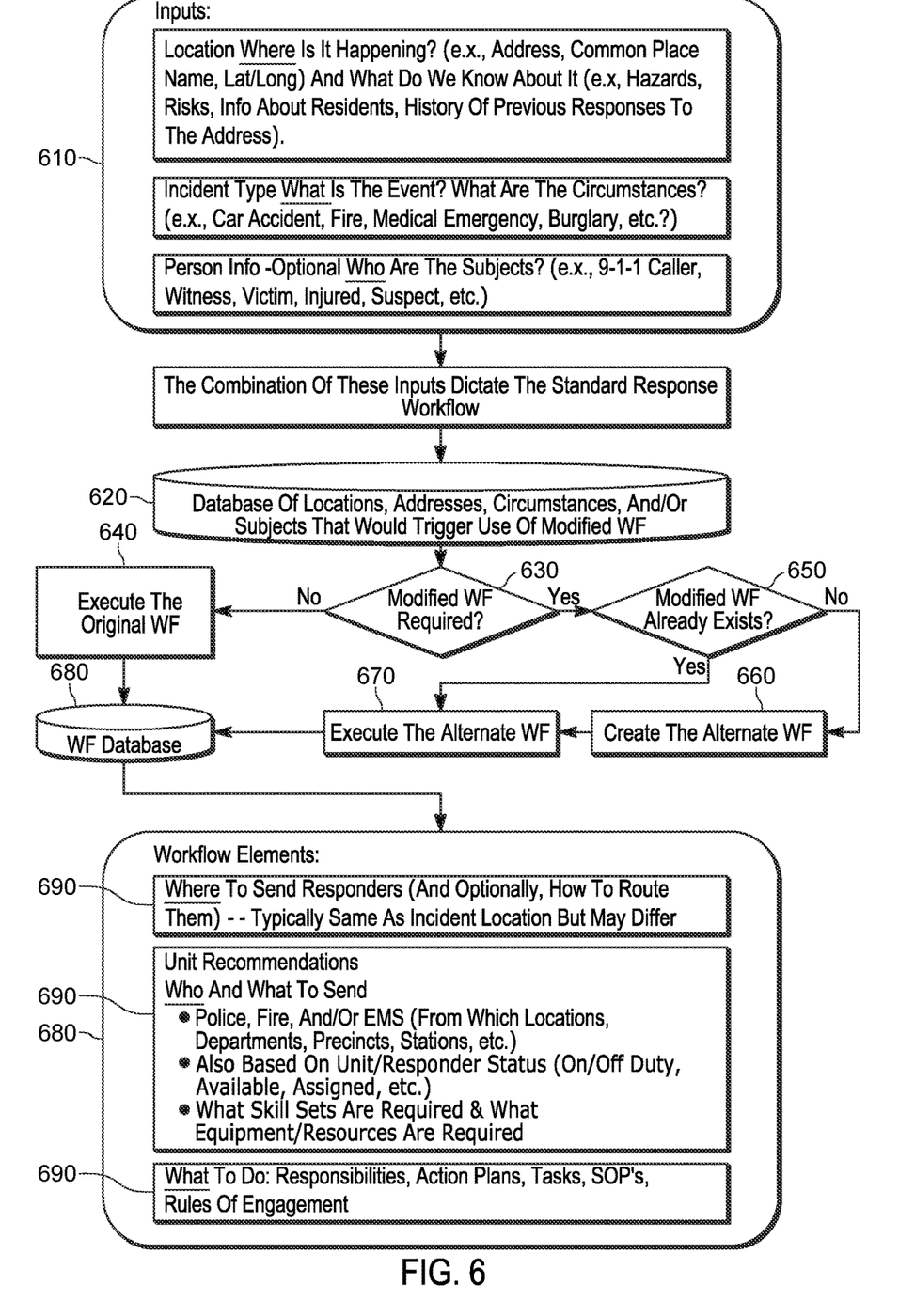
FIG. 6 is a flowchart of a method for public safety workflow modification in accordance with some embodiments.

FIG. 6 illustrates a flow diagram of an example method 600 for public safety workflow modification. In the example illustrated in FIG. 6, the method 600 includes receiving, at the electronic processor 210, inputs 610 corresponding to an incident. The inputs 610 include location information, incident type information, and optionally information regarding one or more persons. The location information includes, for example, where the incident is happening such as an address, a landmark name, global positioning system (GPS) coordinates, and the like. The location information may also include certain traits of the location, for example, hazards, risks, information about residents, history of previous incident responses to the address, traffic information to and from the address, and the like. The incident type information includes, for example, the event and the circumstances. For example, whether the incident is a car accident, a fire, a medical emergency, a burglary, and the like. The information regarding one or more persons includes for example, identity of a 9-1-1 caller, a witness, a victim, an injured person, a suspect, and the like. As shown in FIG. 6, the combination of the above inputs dictates the standard response workflow.

The method 600 includes comparing, using the electronic processor 210, the inputs to a database 620 of locations, addresses, circumstances, and/or subjects that would trigger use of a modified workflow. The database 620 may be part of the database 130. As discussed above with respect to FIG. 4A, the database 130 stores information regarding objects of interests and corresponding attributes. The electronic processor 210 compares the received input 610 to find matches in the database 620. The method 600 also includes determining, using the electronic processor 210, whether a modified workflow is required for the incident (at block 630). The electronic processor 210 may determine that a modified workflow is not required when a match is not found in the database 620. The electronic processor 210 may also determine that a modified workflow is not required when a match is found in the database 620, but the combination of inputs based on the information stored in the database 620, do not satisfy a trigger condition for a modified workflow. The electronic processor 210 determines that a modified workflow is required when a match is found in the database 620 and a trigger condition is satisfied.

When a modified workflow is not required, the method 600 executes, using the electronic processor, the original incident workflow (at block 640). When a modified workflow is required, the method 600 includes determining, using the electronic processor 210, whether a modified workflow already exists (at block 650). The electronic processor 210 may have a-priori information on whether alternative workflows already exist in the database 130. The original incident workflows and the modified workflows may be indexed such that the workflows can be searched to determine whether an alternative workflow exists. When a modified incident workflow according to the inputs 610 is not found in the database 130, the method 600 includes creating, using the electronic processor 210, the modified incident workflow (at block 660).

When a modified incident workflow already exists or after creating the modified incident workflow, the method 600 includes executing, using the electronic processor 210, the modified incident workflow (at block 670). The electronic processor 210 accesses the original incident workflow (for block 640) or the modified incident workflow (for block 670) using a workflow database 680. An example of the workflow database 680 is shown in FIG. 4B, which is stored in the database 130. Each workflow includes several workflow elements 690. The workflow elements 690 include location information, for example, where to send responders and optionally, how to route the responders. The workflow elements 690 also include unit recommendations, for example, which public safety units are to be sent and what equipment should be sent. The public safety units may include police, fire, and/or emergency medical services units. The unit recommendations may also include information related to which locations, departments, precincts, and/or stations the respondents are to be sent from. The unit recommendations may include criteria to take into account when selecting the units, for example, whether any responders are off duty, available, or assigned to another incident. The unit recommendations also include information relating to the skill sets and equipment or resources of the units. The workflow elements 690 further include information relating to what to do at the incident. For example, responsibilities of responding public safety personnel, action plans, tasks, rules of engagement, and standard operating procedures (SOPs). When an incident workflow is modified, it is the workflow elements 690 that are modified, an example of which is shown in FIG. 5.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A command server comprising:
an electronic processor configured to
receive, at the electronic processor of the command server, information corresponding to an object of interest in various electronic forms from a set of electronic devices;

analyze, using the electronic processor of the command server, the information in various electronic forms to identify one or more attributes corresponding to the object of interest affecting an incident workflow for the object of interest;

determine, using the electronic processor of the command server, whether the identified one or more attributes affect the incident workflow for the object of interest;

in response to the electronic processor of the command server determining that the identified one or more attributes affect the incident workflow for the object of interest, generate, using the electronic processor of the command server, a modified incident workflow for the object of interest based on the incident workflow and the one or more attributes;

generate, using the electronic processor of the command server, a trigger condition based on the one or more attributes of the object of interest;

store, in a database using the electronic processor of the command server, the modified incident workflow and the trigger condition corresponding to the modified incident workflow such that the modified incident workflow and the trigger condition are related to the object of interest in the database, the trigger condition generated based on the one or more attributes, the database including a first table relating the object of interest to the one or more attributes of the object of interest and a second table relating the object of interest to the incident workflow and the modified incident workflow;

receive, at the electronic processor of the command server, a request for action corresponding to the object of interest, the request indicating occurrence of an incident relating to the object of interest, wherein the request includes an object field, an incident field, and a condition field, wherein the object field specifies a location of the object of interest, the incident field specifies a type of the incident, and condition field specifies a condition of the incident, wherein the condition of the incident is separate from an identity of the object of interest;

determine, using the electronic processor of the command server, whether the request satisfies the trigger condition based on the condition field;

determining that the request satisfies the trigger condition, output, using the electronic processor of the command server, the modified incident workflow to a first subset of the set of electronic devices, wherein the first subset consists of electronic devices configured to output the modified incident workflow via a display and that are present at the location of the incident, each electronic device being configured to output the modified incident workflow via a respective display of the electronic device; and in response to the electronic processor of the command server determining that the request does not satisfy the trigger condition, output, using the electronic processor of the command server, the incident workflow to a second subset of the set of electronic devices, wherein the second subset consists of electronic devices configured to output the incident workflow via a display and that are present at the location of the incident each electronic device being configured to output the incident workflow via the respective display of the electronic device.

2. The command server of claim 1, wherein the electronic processor is further configured to store, in the database, the one or more attributes such that the one or more attributes are related to the object of interest.

3. The command server of claim 1, wherein the incident workflow is a first incident workflow corresponding to a first incident type, the modified incident workflow is a first modified incident workflow, and the trigger condition is a first trigger condition, wherein the electronic processor is further configured to
store, in the database, the first incident workflow and the first modified incident workflow in relation to the first incident type.

4. The command server of claim 3, wherein the electronic processor is configured to
output the first modified incident workflow in response to the object field specifying the object of interest, the incident field specifying the first incident type, and the condition field specifying the first trigger condition; and
output the first incident workflow in response to the object field specifying the object of interest, the incident field specifying the first incident type, and the condition field not specifying the first trigger condition.

5. The command server of claim 4, wherein the electronic processor is further configured to
identify a second incident workflow corresponding to a second incident type affected by the one or more attributes;
generate a second modified incident workflow for the object of interest based on the second incident workflow and the one or more attributes; and
store, in the database, the second modified incident workflow and a second trigger condition corresponding to the second modified incident workflow such that the second modified incident workflow and the second trigger condition are related to the object of interest in the database, the second trigger condition generated based on the one or more attributes.

6. The command server of claim 5, wherein the electronic processor is further configured to
output the second modified incident workflow in response to the object field specifying the object of interest, the incident field specifying the second incident type, and the condition field specifying the second trigger condition; and
output the second incident workflow in response to the object field specifying the object of interest, the incident field specifying the second incident type, and the condition field not specifying the second trigger condition.

7. The command server of claim 1, wherein the electronic processor is further configured to
identify a plurality of incident workflows for the object of interest affected by the one or more attributes;
generate a plurality of modified incident workflows for the object of interest based on the plurality of incident workflows and the one or more attributes; and
store, in the database, the plurality of modified incident workflows and a plurality of trigger conditions corresponding to the plurality of modified incident workflows such that the plurality of modified incident workflows and the plurality of trigger conditions are related to the object of interest in the database, the plurality of trigger conditions generated based on the one or more attributes.

8. The command server of claim 1, wherein the electronic processor is further configured to
after outputting the incident workflow
receive an updated request satisfying the trigger condition; and
output the modified incident workflow in real time in response to the updated request satisfying the trigger condition.

9. The command server of claim 1, wherein when determining whether the request satisfies the trigger condition the electronic processor is configured to:
provide a received input as an input to the first table and receiving an output from the first table corresponding to one of the incident workflow and the modified incident workflow; and
provide the output of the first table as an input to the second table and receiving an output from the second table, the output from the second table being one of the incident workflow and the modified incident workflow.

10. The command server of claim 1, wherein the electronic processor is further configured to
provide the incident workflow or the modified incident workflow to a portable communications device of a responding public safety personnel at an incident location.

11. The command server of claim 1, wherein the electronic processor is configured to receive the information corresponding to the object of interest in various electronic forms from a CCTV camera.

12. The command server of claim 1, wherein the database is a relational database.

13. A method for modifying future workflows based on information received at current day, the method comprising:
receiving, at an electronic processor of a command server, information corresponding to an object of interest in various electronic forms from a set of electronic devices;
analyzing, using the electronic processor of the command server, the information in various electronic forms to identify one or more attributes corresponding to the object of interest affecting an incident workflow for the object of interest;
determining, using the electronic processor of the command server, whether the identified one or more attributes affect the incident workflow for the object of interest;
in response to the electronic processor of the command server determining that the identified one or more attributes affect the incident workflow for the object of interest, generating, using the electronic processor of the command server, a modified incident workflow for the object of interest based on the incident workflow and the one or more attributes;
generating, using the electronic processor of the command server, a trigger condition based on the one or more attributes of the object of interest;
storing, in a database using the electronic processor of the command server, the modified incident workflow and the trigger condition corresponding to the modified incident workflow such that the modified incident workflow and the trigger condition are related to the object of interest in the database, the trigger condition generated based on the one or more attributes, the database including a first table relating the object of interest to the one or more attributes of the object of interest and a second table relating the object of interest to the incident workflow and the modified incident workflow;
receiving, at the electronic processor of the command server, a request for action corresponding to the object of interest, the request indicating occurrence of an incident relating to the object of interest, wherein the request includes an object field, an incident field, and a condition field, wherein the object field specifies a location of the object of interest, the incident field specifies a type of the incident, and condition field specifies a condition of the incident, wherein the condition of the incident is separate from an identity of the object of interest;
determining, using the electronic processor of the command server, whether the request satisfies the trigger condition based on the condition field;
in response to the electronic processor of the command server determining that the request satisfies the trigger condition, outputting, using the electronic processor of the command server, the modified incident workflow to a first subset of the set of electronic devices, wherein the first subset consists of electronic devices configured to output the modified incident workflow via a display and that are present at the location of the incident, each electronic device being configured to output the modified incident workflow via a respective display of the electronic device; and
in response to the electronic processor of the command server determining that the request does not satisfy the trigger condition, outputting, using the electronic processor, the incident workflow to a second subset of the set of electronic devices, wherein the second subset consists of electronic devices configured to output the incident workflow via a display and that are present at the location of the incident, each electronic device being configured to output the incident workflow via the display of the electronic device.

14. The method of claim 13, further comprising storing, in the database, the one or more attributes such that the one or more attributes are related to the object of interest.

15. The method of claim 13, wherein the incident workflow is a first incident workflow corresponding to a first incident type, the modified incident workflow is a first modified incident workflow, and the trigger condition is a first trigger condition, the method further comprising:
storing, in the database, the first incident workflow in relation to the first incident type.

16. The method of claim 15, the method further comprising:
outputting, using the electronic processor, the first modified incident workflow in response to the object field specifying the object of interest, the incident field specifying the first incident type, and the condition field specifying the first trigger condition; and
outputting, using the electronic processor, the first incident workflow in response to the object field specifying the object of interest, the incident field specifying the first incident type, and the condition field not specifying the first trigger condition.

17. The method of claim 16, further comprising:
identifying, using the electronic processor, a second incident workflow corresponding to a second incident type affected by the one or more attributes;

generating, using the electronic processor, a second modified incident workflow for the object of interest based on the second incident workflow and the one or more attributes; and storing, in the database, the second modified incident workflow and a second trigger condition corresponding to the second modified incident workflow such that the second modified incident workflow and the second trigger condition are related to the object of interest in the database, the second trigger condition generated based on the one or more attributes.

18. The method of claim 17, further comprising:

outputting, using the electronic processor, the second modified incident workflow in response to the object field specifying the object of interest, the incident field specifying the second incident type, and the condition field specifying the second trigger condition; and outputting, using the electronic processor, the second incident workflow in response to the object field specifying the object of interest, the incident field specifying the second incident type, and the condition field not specifying the second trigger condition.

19. The method of claim 13, further comprising:

identifying, using the electronic processor, a plurality of incident workflows for the object of interest affected by the one or more attributes;

generating, using the electronic processor, a plurality of modified incident workflows for the object of interest based on the plurality of incident workflows and the one or more attributes; and storing, in the database, the plurality of modified incident workflows and a plurality of trigger conditions corresponding to the plurality of modified incident workflows such that the plurality of modified incident workflows and the plurality of trigger conditions are related to the object of interest in the database, the plurality of trigger conditions generated based on the one or more attributes.

20. The method of claim 13, further comprising:

after outputting the incident workflow receiving, using the electronic processor, an updated request satisfying the trigger condition; and outputting, using the electronic processor, the modified incident workflow in real time in response to the updated request satisfying the trigger condition.

21. The method of claim 13, wherein determining whether the request satisfies the trigger condition includes:

providing a received input as an input to the first table and receiving an output from the first table corresponding to one of the incident workflow and the modified incident workflow; and providing the output of the first table as an input to the second table and receiving an output from the second table, the output from the second table being one of the incident workflow and the modified incident workflow.

22. The method of claim 13, further comprising:

providing the incident workflow or the modified incident workflow to a portable communications device of a responding public safety personnel at an incident location.

23. The method of claim 13, further comprising receiving the information corresponding to the object of interest in various electronic forms from a CCTV camera.

24. The method of claim 13, wherein the database is a relational database.

\* \* \* \* \*